(12) United States Patent
Ibrahim

(10) Patent No.: US 8,385,339 B1
(45) Date of Patent: Feb. 26, 2013

(54) TRANSMITTING AND RECEIVING MESSAGES

(75) Inventor: Yakentim Mela Ibrahim, Brier, WA (US)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 12/764,181

(22) Filed: Apr. 21, 2010

(51) Int. Cl.
*H04L 12/28* (2006.01)

(52) U.S. Cl. .................. 370/390; 370/432; 455/431

(58) Field of Classification Search .................. None
See application file for complete search history.

(56) References Cited

U.S. PATENT DOCUMENTS

| | | | |
|---|---|---|---|
| 6,885,863 B2 * | 4/2005 | Parkman et al. | 455/427 |
| 7,027,767 B2 | 4/2006 | de La Chapelle et al. | |
| 7,137,594 B2 * | 11/2006 | Mitchell et al. | 244/118.6 |
| 7,177,638 B2 * | 2/2007 | Funderburk et al. | 455/431 |
| 7,319,854 B2 * | 1/2008 | vonDoenhoff et al. | 455/345 |
| 7,792,109 B2 * | 9/2010 | Gallegos et al. | 370/390 |
| 7,921,442 B2 * | 4/2011 | Richards | 725/76 |
| 7,986,954 B1 * | 7/2011 | Steer | 455/458 |

FOREIGN PATENT DOCUMENTS

DE 102005025703 A1 12/2006

OTHER PUBLICATIONS

"Infrared", Wikipedia, retrieved Apr. 20, 2010, pp. 1-13 http://en.wikipedia.org/wiki/Infrared, pp. 1-5, and dated Apr. 15, 2010.
"Infrared Data Association", Wikipedia, retrieved Apr. 20, 2010, pp. 1-5 http://en.wikipedia.org/wiki/Infrared_Data_Association, dated Apr. 19, 2010.
"What is irSimple Communication?", Infrared Data Association, IrDA The Secure Wireless Link, retrieved Apr. 20, 2010, pp. 1-2, http://www.irda.org/.
"Near Field Communication", Wikipedia, retrieved Apr. 20, 2010, pp. 1-13 http://en.wikipedia.org/wiki/Near_Field_Communication, dated Apr. 14, 2010.
PCT Search Reprot dated Jun. 22, 2011, regarding Application No. PCT/US2011/029197 dated Mar. 21, 2011, issued by International Searching Authority.

* cited by examiner

*Primary Examiner* — Robert Wilson
(74) *Attorney, Agent, or Firm* — Yee & Associates, P.C.

(57) ABSTRACT

The different advantageous embodiments provide a system and method for transmitting messages. In one advantageous embodiment, a system comprising a number of transceiver units, a first computer system, and a second computer system is provided. The number of transceiver units are configured for use in a cabin of a vehicle, each of the number of transceiver units being configured to receive a number of messages and transmit the number of messages to a subsequent transceiver unit, wherein the subsequent transceiver unit is identified based on a physical position of each of the number of transceiver units to one another. The first computer system is configured for use in the cabin, the first computer system receiving the number of messages on a first number of physical network media and transmitting the number of messages over a first wireless communications link to a first transceiver unit in the number of transceiver units.

20 Claims, 10 Drawing Sheets

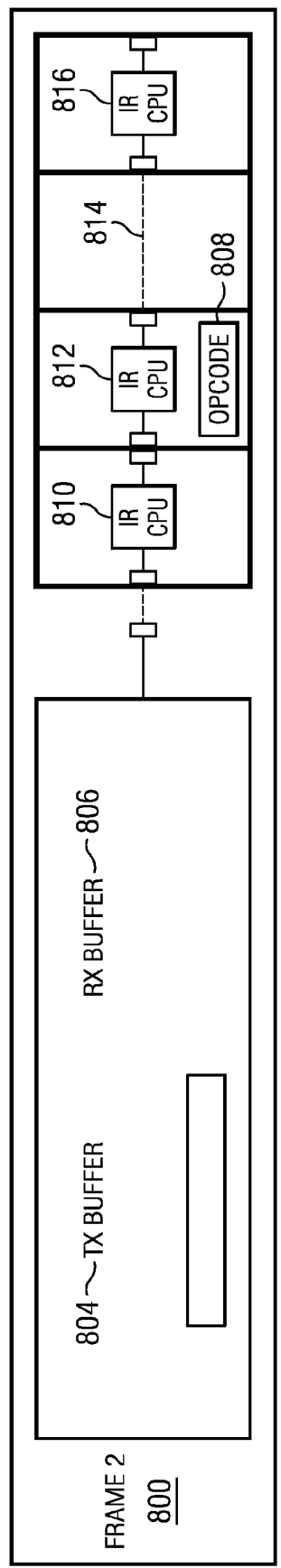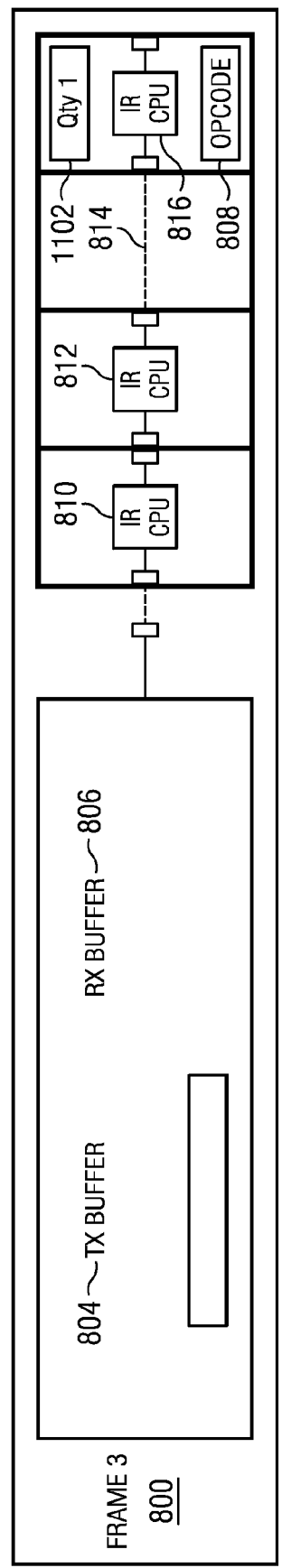

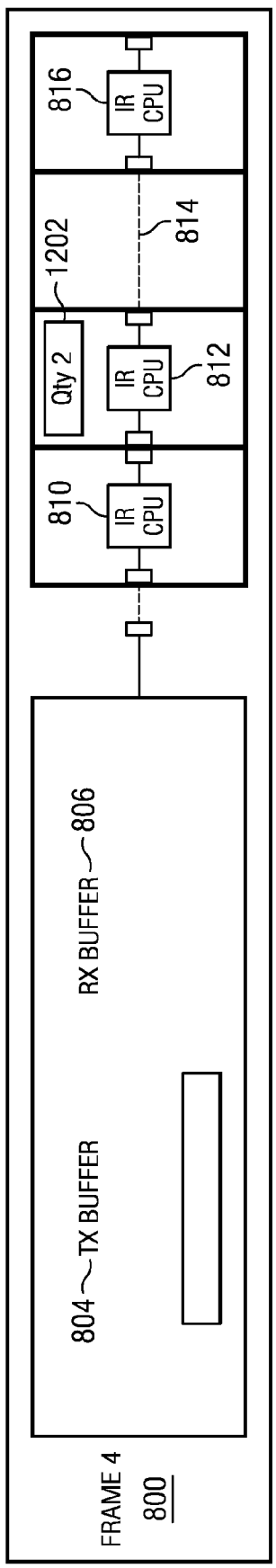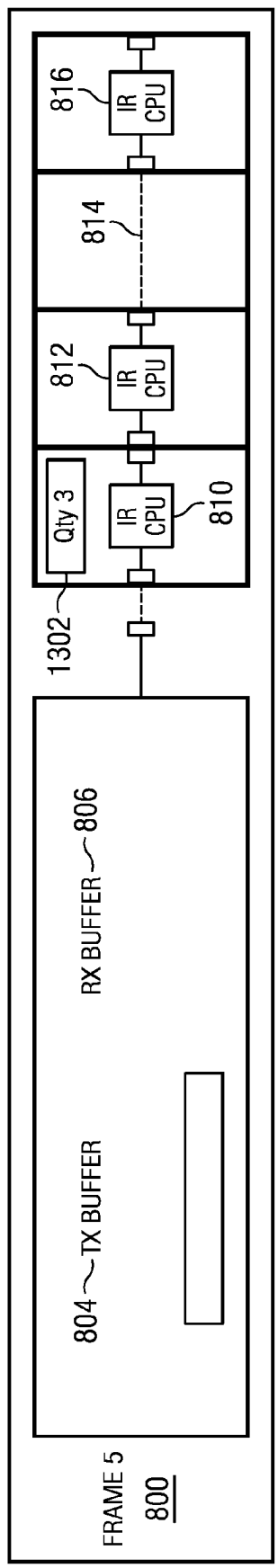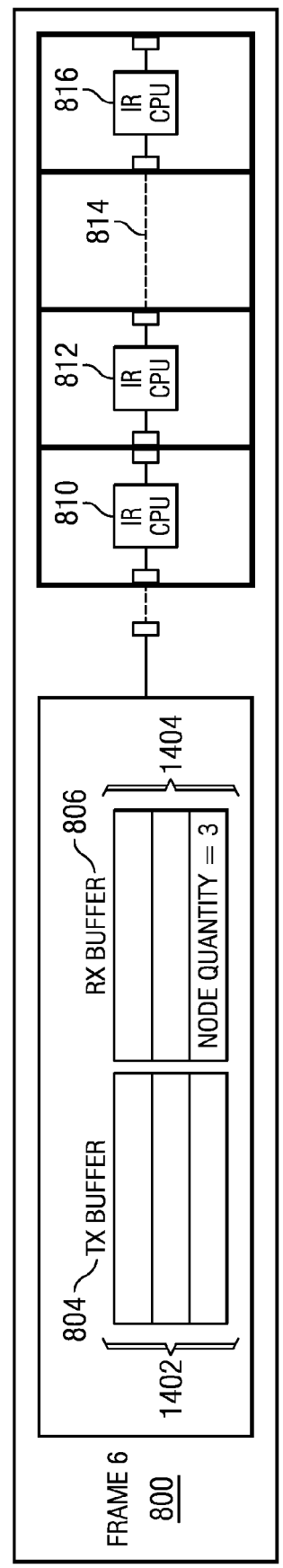

TRANSMITTING AND RECEIVING MESSAGES

BACKGROUND INFORMATION

1. Field:

The present disclosure relates generally to vehicles and in particular to processing messages in data processing systems in vehicles. More specifically, the present disclosure relates to a system and methods for transmitting messages within a vehicle.

2. Background:

Networks are frequently used to transmit data between computer systems on aircraft. Multiple networks may be installed in the same aircraft. For example, an aircraft may have a network for controlling environmental systems, a network for oxygen deployment, or a network for cabin lighting and other suitable networks. However, the multiple networks may use different physical mediums. A physical medium is the real-world substance used to transmit and receive data between the computer systems. For example, Ethernet is a commonly used physical medium.

Many networks use a wire to carry data from one computer system to another. In such networks, wires may be run to locations that a user desires to connect to the network. For example, wiring may extend through the cabin of an aircraft to connect components in different locations of the aircraft. In some examples, the wires extend through the cabin above the passenger seating area. In such examples, the wires may not be visible from the passenger seating area of the cabin because the wires are hidden behind panels. The wires may connect devices in the front of the cabin to devices in the rear of the cabin. Additionally, the wires may connect devices that are located in the passenger seating area.

Changes may be made to the network as well. Wires may be added to connect additional physical positions and/or computer systems. Adding an additional location and/or computer system to the network comprises installing and connecting an additional wire to the network. Changes are often made to the network when the passenger cabin of the aircraft is reconfigured. Reconfiguring the passenger cabin of the aircraft includes moving passenger seats.

Likewise, it may be desirable in some examples to remove a connection to the network from a particular physical position and/or computer system. In such examples, the wire may be disconnected from the network and/or removed from the physical position.

When constructing an aircraft, wiring for networks may be installed in the aircraft for future use. Such wiring is referred to as provisional wiring. In other words, wiring may extend to locations in the aircraft but not connect to a device. The wiring may be connected to a number of devices if the configuration of the passenger cabin is changed in the future. The wiring installed for future use adds to the weight of the aircraft and reduces fuel economy as opposed to an aircraft without the unused wiring.

Alternatively, if the configuration of the passenger cabin is changed and wiring is not present in the new location of devices previously connected to the network, wiring is added to the aircraft to connect devices at the new location. Panels are removed, wiring is added and/or extended, and new connectors are installed to connect the devices to the network. Removing panels, extending wiring, and designing and installing connectors add to the time taken and the cost of changing the configuration of the passenger cabin.

Accordingly, it would be advantageous to have a method and system which takes into account one or more of the issues discussed above as well as possibly other issues.

SUMMARY

The different advantageous embodiments provide a system and method for transmitting messages. In one advantageous embodiment, a system comprising a number of transceiver units, a first computer system, and a second computer system is provided. The number of transceiver units are configured for a cabin of a vehicle, each of the number of transceiver units being configured to receive a number of messages and transmit the number of messages to a subsequent transceiver unit, wherein the subsequent transceiver unit is identified based on a physical position of each of the number of transceiver units. The first computer system is configured for the cabin, the first computer system being configured to receive the number of messages on a first number of physical network media and transmit the number of messages over a first wireless communications link to a first transceiver unit in the number of transceiver units. The second computer system is configured for the aircraft cabin, the second computer system being configured to receive the number of messages over a second wireless communications link from a second transceiver unit in the number of transceiver units, the second computer system being further configured to transmit the number of messages received over the second wireless communications link on a second number of physical network media corresponding to the first number of physical network media.

The different advantageous embodiments also provide a method of transmitting messages. A number of messages are received, by a first computer system configured for a cabin of a vehicle, on a first number of physical network media and transmit the number of messages over a first wireless communications link to a first transceiver unit in a number of transceiver units. The number of messages are received by the number of transceiver units configured for the cabin, and transmit the number of messages to a subsequent transceiver unit, wherein the subsequent transceiver unit is identified based on a physical position of each of the number of transceiver units. The number of messages are received, by a second computer system configured for the cabin, over a second wireless communications link from a second transceiver unit in the number of transceiver units, wherein the second computer system transmits the number of messages received over the second wireless communications link on a second number of physical network media corresponding to the first number of physical network media.

The different advantageous embodiments also provide a system comprising a first computer system and a second computer system. The first computer system is configured to receive a number of messages on a first number of physical network media and transmit the number of messages on a communications link that is different from the first number of physical network media. The second computer system is configured to transmit the number of messages on a second number of physical network media in response to receiving the number of messages on the communications link, wherein each of the number of messages is transmitted on a second physical network medium comprised by the second number of physical network media corresponding to a first physical network medium comprised by the first number of physical network media on which each of the number of messages was received at the first computer system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 10 is an illustration of a portion of a cabin at a third point in time for identifying addresses depicted in accordance with an advantageous embodiment;

FIG. 11 is an illustration of a portion of a cabin at a fourth point in time for indentifying addresses depicted in accordance with an advantageous embodiment;

FIG. 12 is an illustration of a portion of a cabin at a fifth point in time for identifying addresses depicted in accordance with an advantageous embodiment;

FIG. 13 is an illustration of a portion of a cabin at a sixth point in time for identifying addresses depicted in accordance with an advantageous embodiment;

FIG. 14 is an illustration of a portion of a cabin at a seventh point in time for identifying addresses depicted in accordance with an advantageous embodiment;

DETAILED DESCRIPTION

Figure 1:
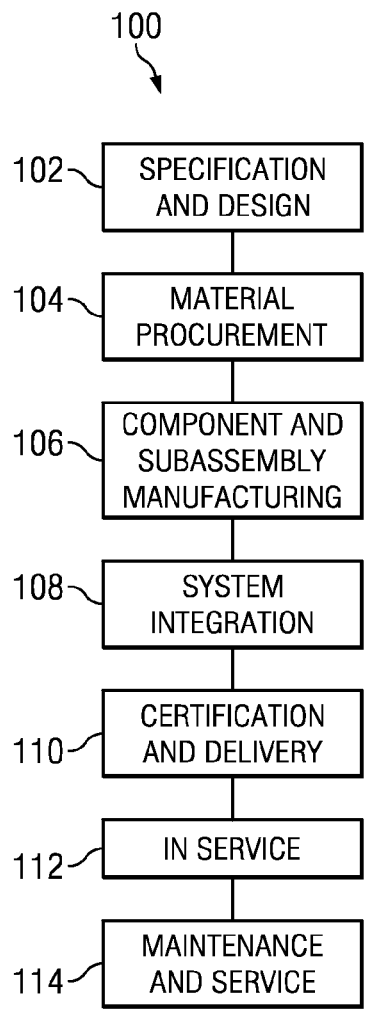
FIG. 1 is an illustration of an aircraft manufacturing and service method in which an advantageous embodiment may be implemented.
Figure 2:
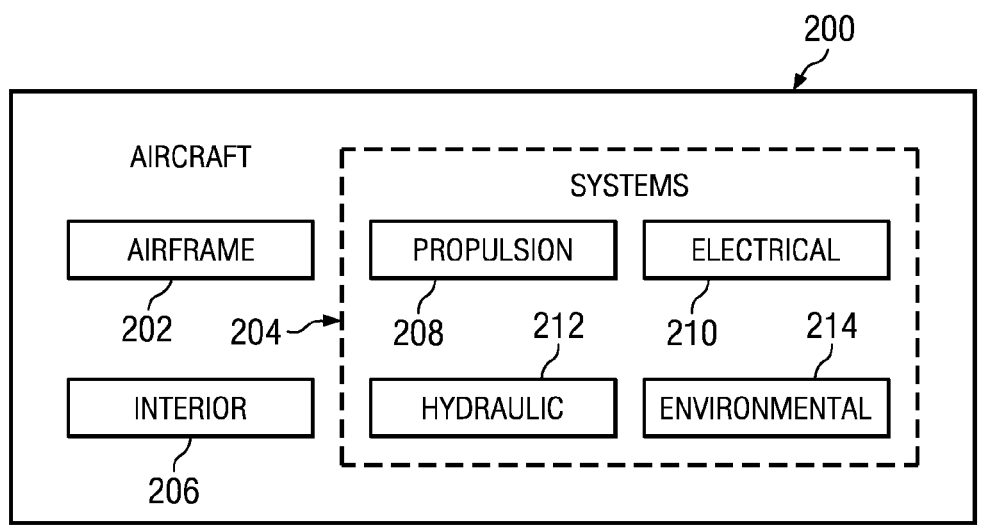
FIG. 2 is an illustration of an aircraft depicted in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

In some advantageous embodiments, components are installed aboard the aircraft during system integration 108. The components include any combination of a number of computer systems, a number of transceiver units, a number of network media or other suitable components. Installing the components comprises positioning the components in advantageous locations aboard the aircraft. For example, the components may be installed such that a computer system is located at the front of a column of passenger seats, a computer system is located behind the column of passenger seats, and a transceiver unit is located above each row of passenger seats in the column.

In other advantageous embodiments, components are installed aboard the aircraft during maintenance and service 114. In such advantageous embodiments, panels in the cabin may be moved, added, replaced, or removed. During maintenance and service 114, wiring may be removed from the aircraft in order to reduce the weight of the aircraft. Panels with wireless communication links may be installed to replace the wiring. Installing the panels with wireless communication links avoids the cost and time of installing and moving additional wiring in future passenger seating changes.

In these examples, "a number of" an item means one or more of the item. For example, "a number of transceiver units" means one or more transceiver units.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Systems and methods embodied herein may be employed during at least one of the stages of aircraft manufacturing and service method 100 in FIG. 1. As described, some advantageous embodiments may be installed, configured, maintained, replaced, and/or removed during component and subassembly manufacturing 106. However, other advantageous embodiments may be installed, configured, maintained, replaced, and/or removed during a number of other stages in aircraft manufacturing and service method 100.

Additionally, components of the system and methods embodied herein may be installed, configured, maintained, and/or replaced in interior 206 and/or removed from interior 206. However, the components may also be located in other portions of aircraft 200.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of system embodiments, method embodiments, or a combination thereof may be utilized during production stages, such as component and subassembly manufacturing 106 and system integration 108 in FIG. 1. A number, when referring to items, means "one or more items". For example, a "number of system embodiments" is one or more system embodiments. A number of system embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

Figure 3:
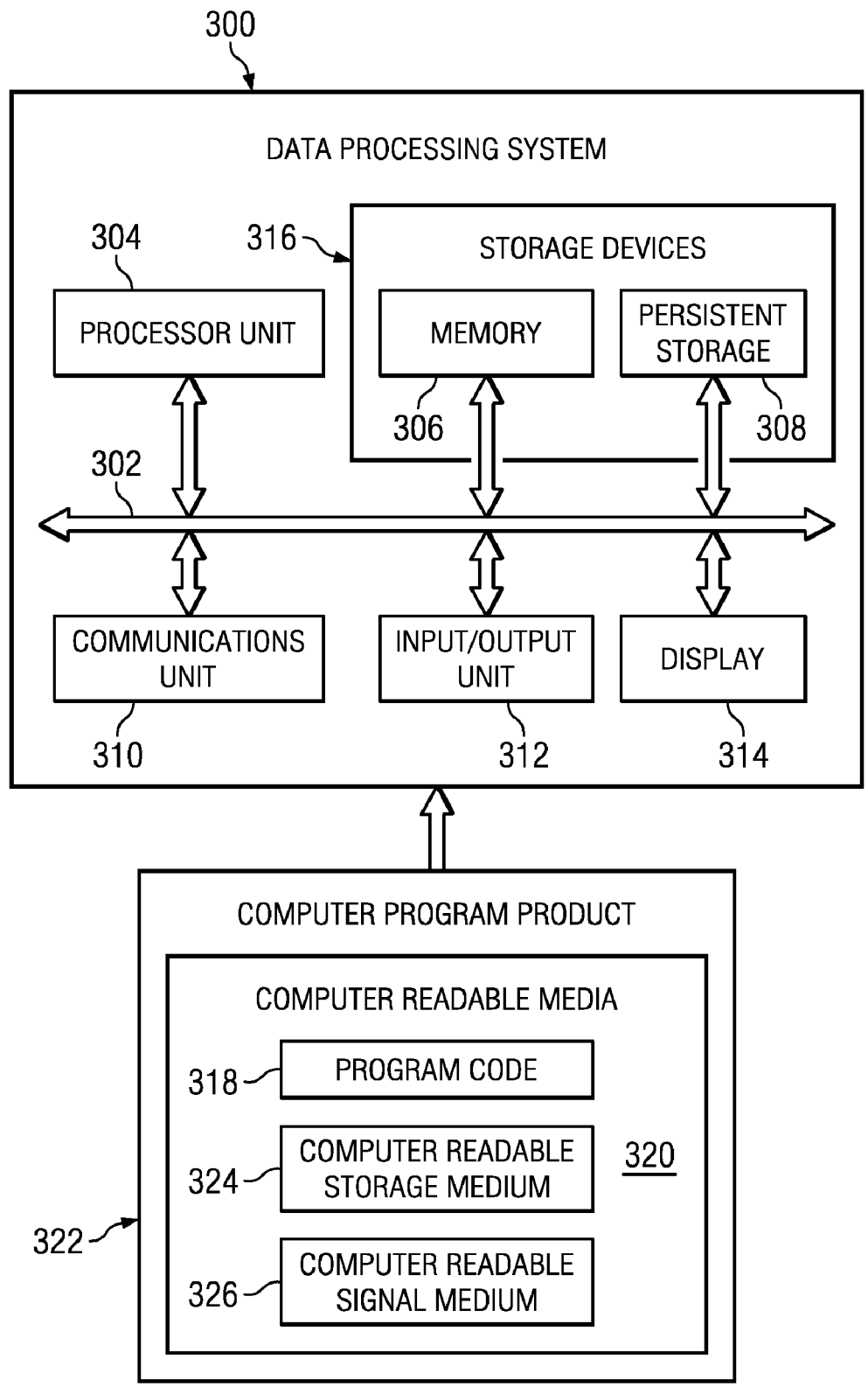
FIG. 3 is an illustration of a block diagram of a data processing system depicted in accordance with an advantageous embodiment.

Turning now to FIG. 3, an illustration of a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, may be a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory such as memory 306.

These instructions are referred to as program code, computer usable program code, or computer readable program code that may be read and executed by a processor in processor unit 304. The program code in the different embodiments may be embodied on different physical or computer readable storage media such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage medium 324 or computer readable signal medium 326. Computer readable storage medium 324 may include, for example, an optical or magnetic disc that is inserted or placed into a drive or other device that is part of persistent storage 308 for transfer onto a storage device, such as a hard drive that is part of persistent storage 308. Computer readable storage medium 324 also may take the form of a persistent storage, such as a hard drive, a thumb drive, or a flash memory that is connected to data processing system 300. In some instances, computer readable storage medium 324 may not be removable from data processing system 300. In these illustrative examples, computer readable storage medium 324 is a non-transitory computer readable storage medium.

Alternatively, program code 318 may be transferred to data processing system 300 using computer readable signal medium 326. Computer readable signal medium 326 may be, for example, a propagated data signal containing program code 318. For example, computer readable signal medium 326 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal medium 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache, such as a cache found in an interface and memory controller hub that may be present in communications fabric 302.

The different advantageous embodiments recognize and take into account a number of different considerations. For example, the different advantageous embodiments recognize that aircraft commonly have a number of networks. The number of networks take the form of different physical media. For example, the aircraft may be equipped with two Ethernet networks, a controller area network (CAN) bus network, and a discrete signal network. Each network may be used for a different purpose. For example, a CAN bus network may be used to monitor the health of oxygen distribution systems. Components of the oxygen distribution systems are located in passenger service units. The passenger service units are located above each row of passenger seats on the aircraft.

The different advantageous embodiments also recognize and take into account that the passenger service units above each row of passenger seats may be moved and/or reconfigured during the operational life of the aircraft. For example, the passenger service units may be moved when a new seating plan is used in the aircraft. In other words, a new seating plan changes the pitch between seats. The pitch is the space between seats in a column. The seating plan may be changed to allow for more seats to be installed in the aircraft. Alternatively, the seating plan may be changed to allow for each seat to be surrounded by additional space. Passenger service units may be connected to the networks in the aircraft using a number of wires.

The different advantageous embodiments recognize and take into account that the number of wires may not have extra wire to allow a connection to the passenger service panel to be moved without reworking the number of wires and/or the connection to the passenger service panel. In some examples, a new connector must be designed and/or wires must be rerun from another location. Reworking the wiring in the aircraft is disadvantageous because this process increases the cost of changing the seat plan on the aircraft. Alternatively, additional wire may be installed during the initial configuration of the aircraft. Installing additional wire during initial configuration of the aircraft is disadvantageous, however, because the extra cable adds weight to the aircraft and decreases fuel economy.

The different advantageous embodiments also recognize and take into account that wireless communication between the passenger service units and the networks on the aircraft allow the passenger service units to be moved during a seat plan change without reworking wiring and/or connectors.

Thus, the different advantageous embodiments provide a system and method for transmitting messages. In one advantageous embodiment, a system comprising a number of transceiver units, a first computer system, and a second computer system is provided. The number of transceiver units are configured for use in a cabin of an aircraft, each of the number of transceiver units being configured to receive a number of messages and transmit the number of messages to a subsequent transceiver unit, wherein the subsequent transceiver unit is identified based on a physical position of the each of the number of transceiver units to one another. The first computer system is configured for use in the cabin, the first computer system being configured to receive the number of messages on a first number of physical network media and transmit the number of messages over a first wireless communications link to a first transceiver unit in the number of transceiver units. The second computer system is configured for use in the aircraft cabin, the second computer system being configured to receive the number of messages over a second wireless communications link from a second transceiver unit in the number of transceiver units, the second computer system being further configured to transmit the number of messages received over the second wireless communications link on a second number of physical network media corresponding to the first number of physical network media.

Figure 4:
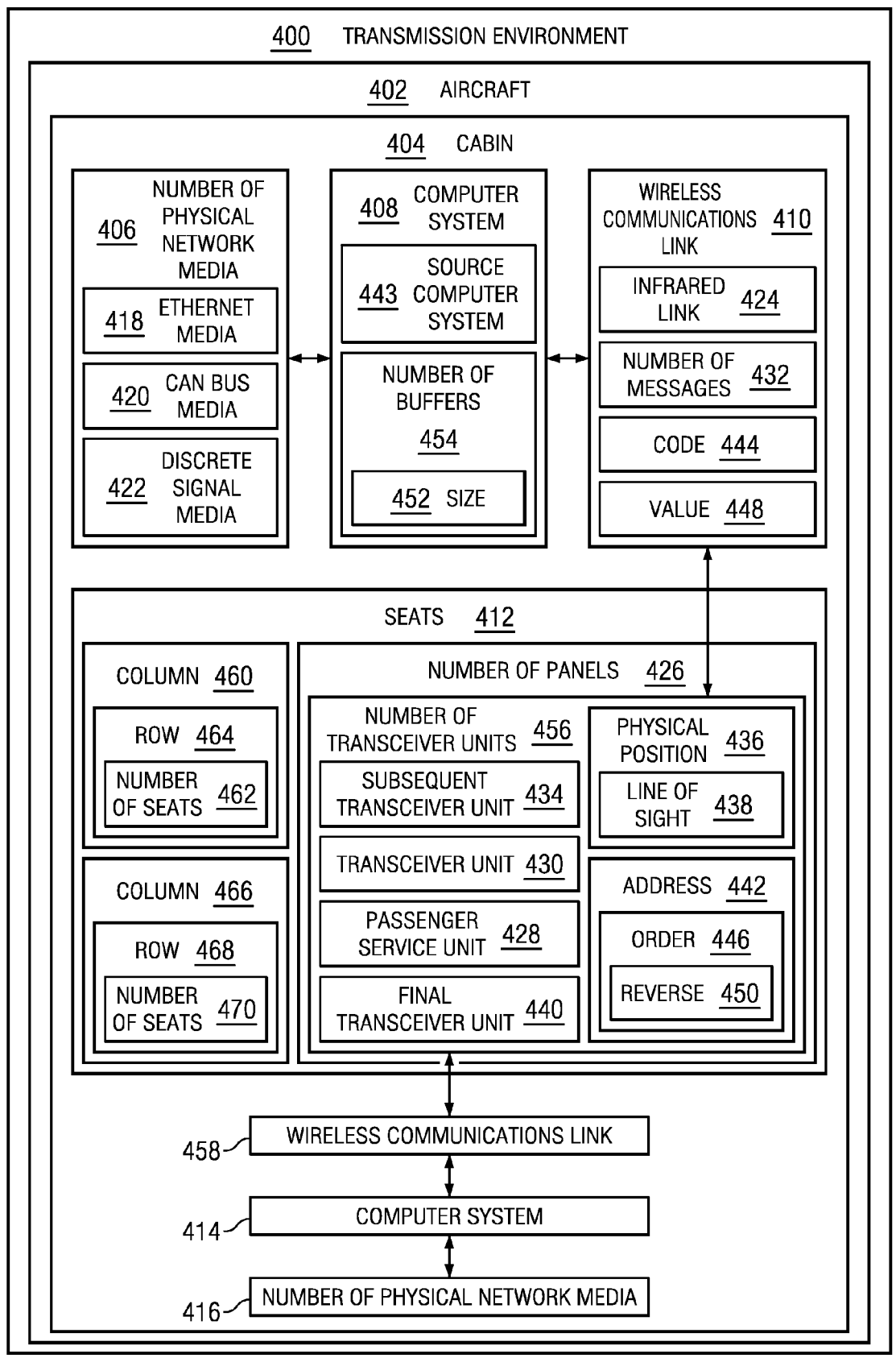
FIG. 4 is an illustration of a block diagram of a transmission environment depicted in accordance with an advantageous embodiment.

Turning now to FIG. 4, an illustration of a transmission environment is depicted in accordance with an advantageous embodiment. Transmission environment 400 may be implemented in aircraft 200 in FIG. 2.

In these examples, transmission environment 400 includes aircraft 402. Of course, transmission environment 400 may also contain other vehicles or locations that contain networks. For example, transmission environment may comprise a building and/or an automobile.

Aircraft 402 is discussed in these examples. However, aircraft 402 is a non-limiting example of a vehicle in accordance with an advantageous embodiment. Other vehicles may be used in addition to or in place of aircraft 402. A vehicle, as used herein, is a device used for transporting people and/or objects. For example, the vehicle may be a bus, a train, a boat, or any other suitable vehicle that has seats configured in rows and/or columns.

Cabin 404 is present within aircraft 402. Cabin 404 is an area suitable for humans or objects to be present during operation of the aircraft. Cabin 404 consists of any combination of a passenger cabin, a cockpit, and a cargo bay. In this advantageous embodiment, cabin 404 contains number of physical network media 406, computer system 408, wireless communications link 410, seats 412, computer system 414, and number of physical network media 416.

Number of physical network media 406 make up a number of networks present in cabin 404. The networks are used for communications between systems onboard aircraft 402. In these examples, number of physical network media 406 comprise Ethernet media 418, CAN bus media 420, and discrete signal media 422. CAN bus media is a controller area network bus. Discrete signal media 422 is a media on which a voltage on the media is varied such that the changes in voltage are recognized by devices on discrete signal media 422. Of course, number of physical network media 406 may consist of additional and/or different types of media.

Number of physical network media 406 are connected to computer system 408. Computer system 408 is a data processing system. Computer system 408 may be an example implementation of data processing system 300 from FIG. 3. Of course, some components from data processing system 300 may not be present in computer system 408 and/or additional components may be present in computer system 408. Computer system 408 is configured to send and receive data using wireless communications link 410.

Wireless communications link 410 is a substance through which signals can travel. Wireless communications link 410 is a part of a network. In these examples, however, wireless communications link 410 is a different type of media than number of physical network media 406. For example, number of physical network media 406 may comprise Ethernet media 418, CAN bus media 420, and discrete signal media 422, while wireless communications link 410 is infrared link 424. Number of panels 426 are associated with seats 412.

A first component is considered to be associated with a second component by being secured to the second component, bonded to the second component, fastened to the second component, and/or connected to the second component in some other suitable manner. The first component also may be connected to the second component through using a third component. The first component is also considered to be associated with the second component by being formed as part of and/or an extension of the second component.

In these examples, seats 412 are positioned in rows, such as row 464. Row 464 contains number of seats 462. Number of panels 426 are located above number of seats 462 such that a panel corresponds to number of seats 462 associated with the panel. Row 464 is a part of column 460. Column 460 and column 466 each consist of rows of seats, such as row 464 and row 468, respectively. Column 460 is separated from another column, such as column 466, by a walkway or aisle. Additional columns may be present in cabin 404.

In other words, column 460 contains row 464. Row 464 contains number of seats 462. Number of seats 462 are associated with a panel in number of panels 426. Thus, in some advantageous embodiments, row 464 may be associated with more than one panel in number of panels 426.

Likewise, column 466 contains row 468. Row 468 contains number of seats 470. Number of seats 470 are associated with a panel in number of panels 426. Thus, in some advantageous embodiments, row 468 may be associated with more than one panel in number of panels 426.

In these examples, each panel in number of panels 426 is a passenger service unit 428. A passenger service unit is a device that provides a number of services to a number of passengers sitting in number of seats 462. For example, passenger service unit 428 may provide a switchable light, ventilation, and/or oxygen distribution through a mask.

Number of panels 426 are associated with number of transceiver units 456. In one advantageous embodiment, each panel is associated with one transceiver unit 430 in number of transceiver units 456. Number of transceiver units 456 are devices configured to receive and transmit messages on wireless communications link 410. In these examples, wireless communications link 410 is infrared link 424. In some advantageous embodiments, number of transceiver units 456 are computer systems, like computer system 408 and/or data processing system 300 in FIG. 3. In other advantageous embodiments, number of transceiver units 456 do not contain some components of data processing system 300. For example, number of transceiver units 456 may or may not contain storage devices 316 as in FIG. 3.

Computer system 414 is a computer system like computer system 408. Computer system 414 is connected to number of transceiver units 456 using wireless communications link 458. Computer system 414 is also connected to number of physical network media 416. In these examples, number of physical network media 416 are the same media as number of physical network media 406. However, in other advantageous embodiments, number of physical network media 416 may be different types of media than number of physical network media 406.

Transmission environment 400 may be used to transmit and receive data across the different networks and media contained in transmission environment 400. Number of messages 432 are a number of data communications. The number of data communications may be transmitted across number of physical network media 406 to reach computer system 408, or may be originally transmitted by computer system 408.

Computer system 408 either receives data from other devices on number of physical network media 406 or computer system 408 may create number of messages 432 for transmission. In advantageous embodiments in which data is received on number of physical network media 406, computer system 408 combines the data into number of messages 432. Computer system 408 may combine the data into number of messages 432 by multiplexing the data for transmission on wireless communications link 410. The data may be intended for a number of different devices on the various networks made up of number of physical network media 406.

Computer system 408 then transmits number of messages 432 to number of transceiver units 456 using wireless communications link 410. Computer system 408 transmits number of messages 432 to number of transceiver units 456 by transmitting an infrared representation of number of messages 432 on infrared link 424. A transceiver unit, such as transceiver unit 430, receives number of messages 432. The transceiver unit that receives number of messages 432 then transmits number of messages 432 to subsequent transceiver unit 434.

In these examples, number of transceiver units 456 are configured to send and receiver number of messages 432 to and from each other and computer systems 408 and 414. In one advantageous embodiment, number of transceiver units 456 are positioned in physical position 436 relative to each other. In other words, subsequent transceiver unit 434 is identified by the transceiver unit that most recently received number of messages 432.

In this advantageous embodiment, physical position relative to each other means that each transceiver unit in number of transceiver units 428 is within line of sight 438 of subsequent transceiver unit 434. In this advantageous embodiment, number of transceiver units 428 form a column and each of number of transceiver units 456 receives number of messages 432 from one direction in the column and transmits number of messages 432 to subsequent transceiver unit 434 in the column. Subsequent transceiver unit 434 then transmits number of messages 432 to another subsequent transceiver unit 434 using line of sight 438 in the column of number of transceiver units 456. In these examples, another subsequent transceiver unit 434 is associated with another panel in number of panels 426. Number of transceiver units 456 may comprise two transceivers, with each transceiver directed opposite the other transceiver.

Number of messages 432 is transmitted and received by number of transceiver units 456 from the end of the column closest to computer system 408 to the end of the column farthest from computer system 408. Final transceiver unit 440 receives number of messages 432 once all other transceiver units in number of transceiver units 456 have received number of messages 432. In other words, final transceiver unit 440 is identified as the last transceiver unit in number of transceiver units 456 to receive number of messages 432 from another transceiver unit.

Final transceiver unit 440 then transmits messages 432 to computer system 414 using wireless communications link 458. Wireless communications link 458 may be of the same type as wireless communications link 410. In these examples, wireless communications link 458 is an infrared link. Once computer system 414 receives number of messages 432 from final transceiver unit 440, computer system 414 decodes number of messages 432. Computer system 414 then recreates the original messages that composed number of messages 432 on the corresponding media in number of physical network media 416. In these advantageous embodiments, computer system 414 recreates the data from number of messages 432 on a medium in number of physical network media 416 that matches the medium on which the data was received at computer system 408 on number of physical network media 406. For example, if data from Ethernet media 418 was contained in number of messages 432, computer system 408 recreates the data on an Ethernet medium in number of physical network media 416. Computer system 408 may encode an identifier for number of physical network media 406 on which the data was received.

In some advantageous embodiments, number of messages 432 also contains data intended for receipt and/or processing by transceiver unit 430. In such an advantageous embodiment, each of the number of transceiver units 456 are addressed with address 442. Address 442 is assigned to transceiver unit 430 and is unique among number of transceiver units 456. To assign address 442 to each of number of transceiver units 456, source computer system 443 transmits code 444. Source computer system 443 is a computer system configured to generate code 444. In some advantageous embodiments, source computer system 443 is computer system 408. Code 444 may contain information recognized by number of transceiver units to be coded to identify address 442.

Code 444 is transmitted among number of transceiver units 456 in the same manner as number of messages 432. In other words, code 444 is received by transceiver unit 430 and transmitted to subsequent transceiver unit 434 in order 446. Order 446 is the sequence in which number of transceiver units 456 have line of sight 438 with one another. Code 444 is transmitted along order 446 until final transceiver unit 440 receives code 444.

When code 444 is received by final transceiver unit 440, final transceiver unit 440 transmits value 448 in reverse 450 of order 446. In other words, value 448 is transmitted and received by number of transceiver units 456 in inverted order 446. Each transceiver unit 430 in number of transceiver units 456 modifies value 448 and transmits modified value 448 to the next transceiver unit 430 in reverse 450 of order 446. In one advantageous embodiment, final transceiver unit 440 transmits value 448 of "1" and each transceiver unit 430 increments value 448 by one. Once the first transceiver unit 430 to receive code 444 receives value 448, value 448 is transmitted to computer system 408. Each transceiver unit 430 stores address 442 for transceiver unit 430. Source computer system 443 sets size 452 of number of buffers 454 to value 448. Number of buffers 454 store number of messages 432 prior to transmitting by computer system 408 and/or while wireless communications link 410 is in use by transceiver unit 430 or computer system 414.

The illustration of aircraft 402 in transmission environment 400 is not meant to imply physical or architectural limitations to the manner in which different features may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, additional computer systems 414 may be located between transceiver units 430 in number of transceiver units 456. Computer system 414 may also set size 452 of buffers 454 using value 448. In such an advantageous embodiment, computer system 408 may send value 448 to computer system 414 on wireless communications link 410 through number of transceiver units 456.

Figure 5:
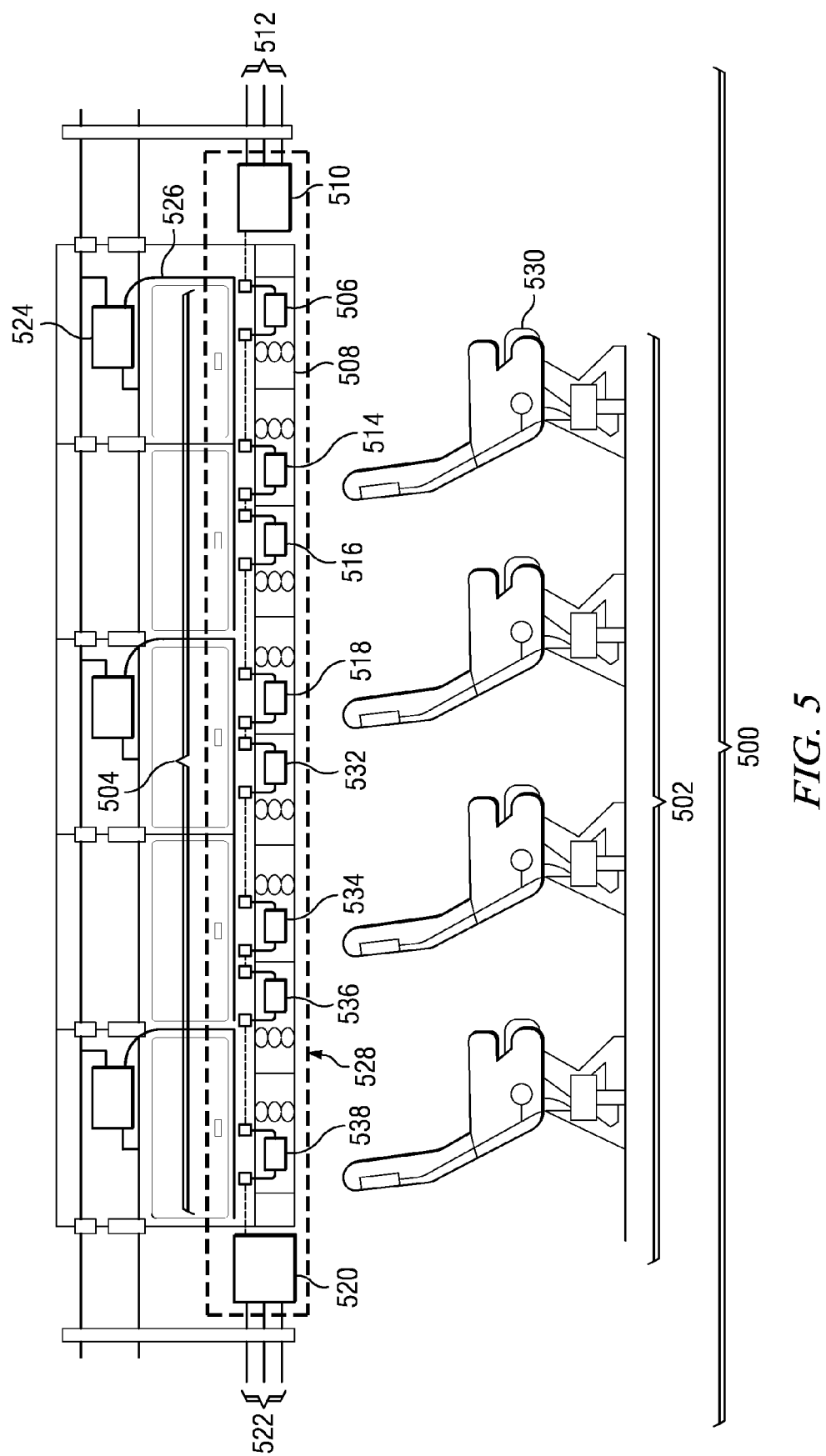
FIG. 5 is an illustration of an aircraft cabin depicted in accordance with an advantageous embodiment.
Figure 6:
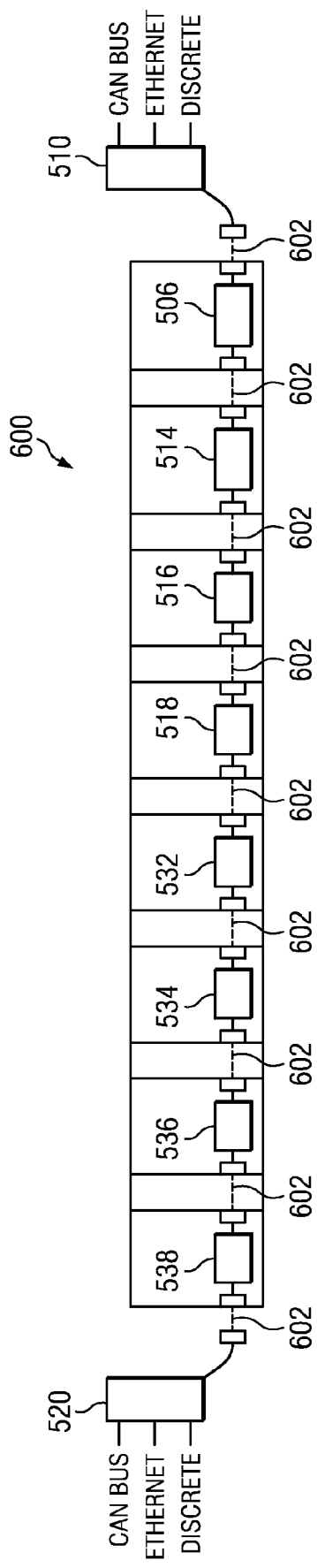
FIG. 6 is an illustration of passenger service units depicted in accordance with an advantageous embodiment.

FIGS. 5 and 6 depict illustrations of an aircraft cabin containing a number of components present in some advantageous embodiments. FIG. 5 presents an overview of the cabin, and FIG. 6 presents a more detailed view of the computer systems and transceiver units.

Turning now to FIG. 5, an illustration of an aircraft cabin is depicted in accordance with an advantageous embodiment. Cabin 500 is an example implementation of cabin 404 in FIG. 4. Cabin 500 contains seats 502. Seats 502 are an example implementation of column 460 within seats 412 in FIG. 4.

Cabin 500 also contains passenger service units 504. Number of passenger service units 504 are example implementations of passenger service unit 428 in FIG. 4. In this advantageous embodiment, each seat in seats 502 is associated with one or more passenger service unit in number of passenger service units 504.

In this advantageous embodiment, each seat is associated with two passenger service units. A passenger service unit is associated with a seat when the passenger service unit provides a number of services for the seat and/or a passenger sitting in the seat. For example, both passenger service unit 506 and passenger service unit 514 are associated with seat 530. In the depicted example, passenger service units 506, 516, 532, and 536 communicate with and operate lighting elements for the seats, and passenger service units 514, 518, 534, and 538 communicate with and operate oxygen deployment systems.

In these examples, a passenger service unit, such as passenger service unit 506, is located within a panel such as panel 508. Panel 508 is an example implementation of a panel in number of panels 426. In the depicted example, panel 508 is associated with seat 530. However, panel 508 may also be associated with other seats in the same row as seat 530 that are not depicted in this illustration.

In this depicted example, messages arrive at computer system 510 on media 512. Computer system 510 is an example implementation of computer system 408 and media 512 are example implementations of number of physical network media 406 in FIG. 4. In these illustrative examples, computer system 510 has an infrared transceiver. Computer system 510 combines the messages from the different media 512 and uses the infrared transceiver to wirelessly transmit the messages to passenger service unit 506.

In the illustrative examples, passenger service unit 506 receives the messages and transmits the messages to passenger service unit 514. Passenger service unit 506 may receive the messages on a first infrared transceiver directed toward computer system 510 to include the line of sight with computer system 510. Passenger service unit 506 may use a second transceiver directed toward passenger service unit 514 to transmit the messages to passenger service unit 514. Passenger service unit 506 may be connected to an electrical power distribution system 524 using wire 526. In the depicted example, wire 526 provides electrical power for all of number of passenger service units 504.

Passenger service unit 514 receives the messages and transmits the messages to passenger service unit 516. Passenger service unit 516 receives the messages and transmits the messages to passenger service unit 518. Passenger service unit 518 receives the messages and transmits the messages to passenger service unit 532. Passenger service unit 532 receives the messages and transmits the messages to passenger service unit 534. Passenger service unit 534 receives the messages and transmits the messages to passenger service unit 536. Passenger service unit 536 receives the messages and transmits the messages to passenger service unit 538. Passenger service unit 538 receives the messages and transmits the messages to computer system 520.

In response to receiving the messages, computer system 520 decodes the messages and uses information in the messages to identify the type of media on which the message was received. Computer system 520 recreates messages on number of physical media 522 such that the messages are transmitted on the same type of physical media on which they were received. In some advantageous embodiments, multiple physical media of the same type are present. In such advantageous embodiments, an additional identifier may be encoded in the messages to identify the networks on which the messages were received.

Portion 528 of cabin 500 is presented with additional detail in FIG. 6.

Turning now to FIG. 6, an illustration of another view of an aircraft cabin is depicted in accordance with an advantageous embodiment. Portion 600 is a more detailed view of portion 528 in FIG. 5.

Computer system 510 combines the messages from the different media 512 and uses an infrared transceiver to wirelessly transmit the messages to passenger service unit 506. Passenger service unit 506 receives the messages and transmits the messages to passenger service unit 514. Passenger service unit 506 may receive the messages on a first infrared transceiver directed toward computer system 510 to include the line of sight with computer system 510. Passenger service unit 506 may use a second transceiver directed toward passenger service unit 514 to transmit the messages to passenger service unit 514. Links 602 represent infrared links in this illustrative example. However, additional passenger service units 506 may be inserted in the physical area traveled by links 602 to connect additional passenger service units 506 to the system.

Passenger service unit 514 receives the messages and transmits the messages to passenger service unit 516. Passenger service unit 516 receives the messages and transmits the messages to passenger service unit 518. Passenger service unit 518 receives the messages and transmits the messages to passenger service unit 532. Passenger service unit 532 receives the messages and transmits the messages to passenger service unit 534. Passenger service unit 534 receives the messages and transmits the messages to passenger service unit 536. Passenger service unit 536 receives the messages and transmits the messages to passenger service unit 538. Passenger service unit 538 receives the messages and transmits the messages to computer system 520. Computer system 520 decodes the messages and uses information in the messages to identify the type of media on which the message was received. Computer system 520 recreates messages on number of physical media 522 such that the messages are transmitted on the same type of physical media on which they were received.

Figure 7:
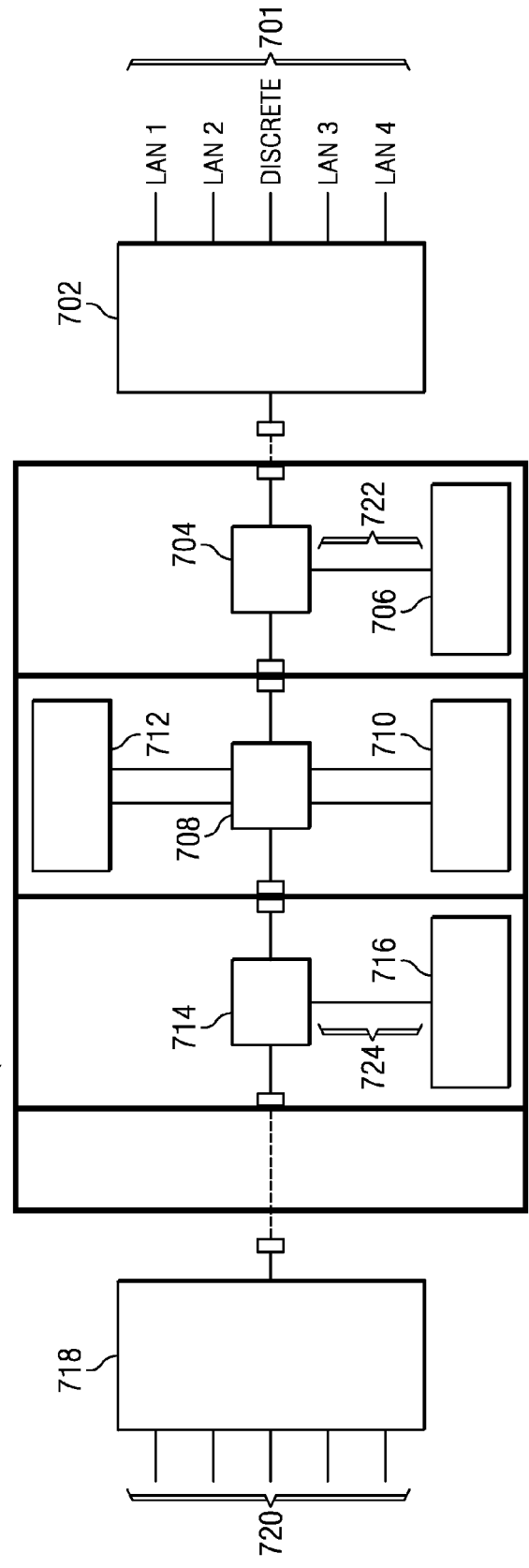
FIG. 7 is an illustration of passenger service units depicted in accordance with an advantageous embodiment.

Turning now to FIG. 7, an illustration of passenger service units is depicted in accordance with an advantageous embodiment. Area 700 may be a portion of an aircraft cabin, such as cabin 500 in FIG. 5.

In this advantageous embodiment, messages are received on number of physical media 701. For example, messages may be received on four Ethernet media and a discrete signal media. Computer system 702 is an example implementation of computer system 408 in FIG. 4. Computer system 702 combines the messages by multiplexing the messages and transmitting the messages to communications unit 704. Communications unit 704 is a transceiving device that processes messages for passenger service unit 706. Passenger service unit 706 is another computer system associated with communications unit 704. Passenger service unit 706 may be an example implementation of data processing system 300 in FIG. 3. In this advantageous embodiment, communications unit 704 and passenger service unit 706 collectively form transceiver unit 722. Transceiver unit 722 is an example implementation of transceiver unit 430 in FIG. 4.

Transceiver unit 722 uses communications unit 704 to transmit the messages to communications unit 708. Communications unit 708 is associated with both passenger service unit 710 and passenger service unit 712. In this advantageous embodiment, passenger service unit 710 and passenger service unit 712 may each have a unique address in the data processing system, such as data processing system 300. Additionally, communications unit 708 used by both passenger service unit 710 and passenger service unit 712 may have a unique address on the infrared link. Thus, passenger service unit 710 and passenger unit 712 may both use communications unit 708, with each of passenger service unit 710, passenger service unit 712, and communications unit 708 having a unique address in the data processing system.

Communications unit 708 transmits the messages to communications unit 714. Communications unit 714 is associated with passenger service unit 716. Communications unit 714 and passenger service unit 716 collectively form transceiver unit 724. Transceiver unit 724 uses communications unit 714 to transmit the messages to computer system 718. Computer system 718 decodes the messages and identifies the media in number of physical media 720 that corresponds to the media in number of physical media 701 on which the message was received. Computer system 718 then transmits the message on the identified medium.

FIGS. 8-14 illustrate an example of identifying an address for each of the number of transceiver units in accordance with an advantageous embodiment. Each figure in FIGS. 8-14 illustrates a point in time later than the previous figure. In other words, FIGS. 8-14 illustrate sequential points in time.

Figure 8:
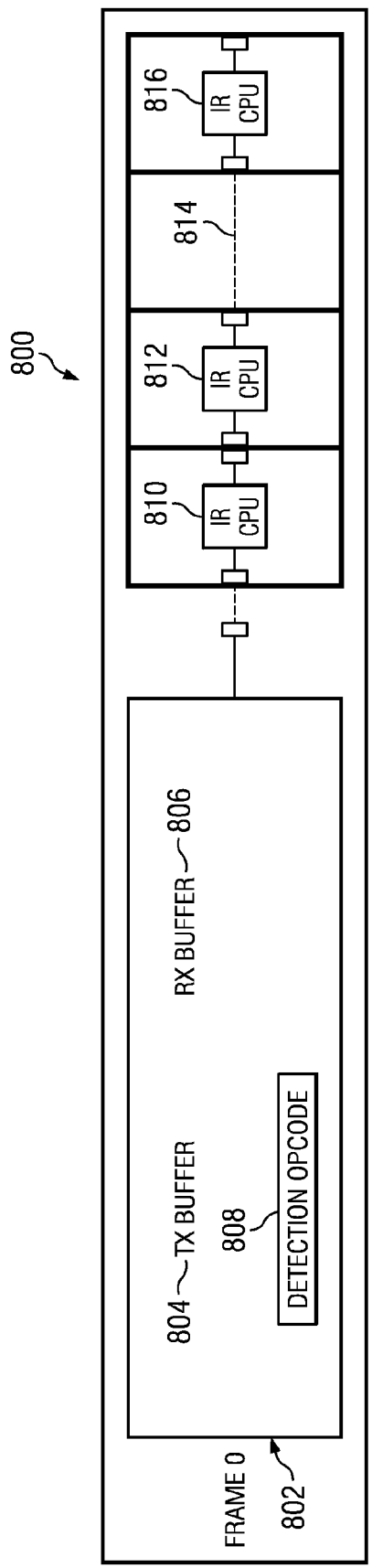
FIG. 8 is an illustration of a portion of a cabin at a first point in time for identifying addresses depicted in accordance with an advantageous embodiment.

Turning now to FIG. 8, an illustration of a portion of a cabin at a first point in time for identifying addresses is depicted in accordance with an advantageous embodiment. Portion 800 is an example implementation of portion 700 in FIG. 7. Portion 800 contains computer system 802, link 814, and transceiving units 810, 812, and 816. Computer system 802 is an example implementation of computer system 408 in FIG. 4. Addresses may be identified for transceiving units 810, 812 and 816 at a prespecified interval, in response to a user input, or in response to an inconsistency in the link quality between transceiving units 810, 812, and 816.

Computer system 802 contains a transmission buffer 804 and a receiving buffer 806. Before the quantity of addresses for transceiving units is known, the transmission buffer 804 is at size 1. Receiving buffer 806 is at size 0. Computer system 802 generates code 808 and stores code 808 in transmission buffer 804. Code 808 is an example implementation of code 444 in FIG. 4.

Figure 9:
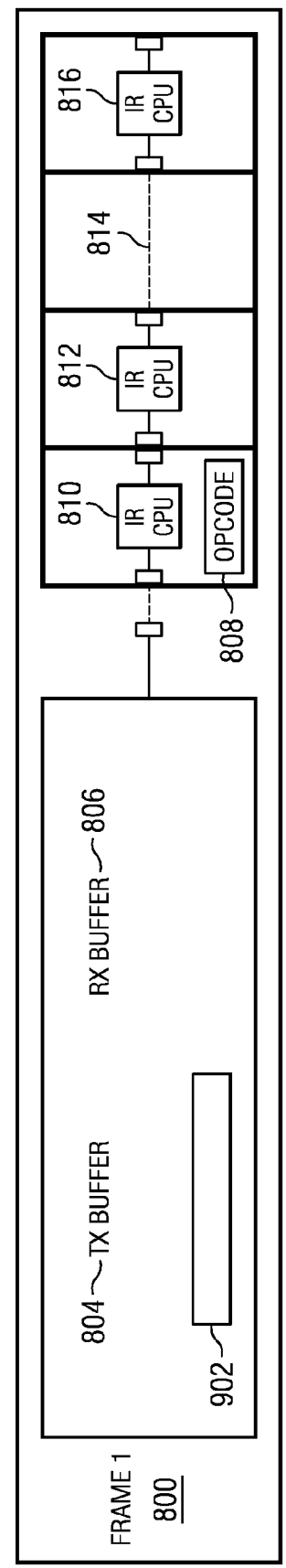
FIG. 9 is an illustration of a portion of a cabin at a second point in time for identifying addresses depicted in accordance with an advantageous embodiment.

Next in FIG. 9, an illustration of a portion of a cabin at a second point in time for identifying addresses is depicted in accordance with an advantageous embodiment. Computer system 802 transmits code 808 to transceiver unit 810 and removes code 808 from transmission buffer 804.

With reference now to FIG. 10, an illustration of a portion of a cabin at a third point in time for identifying addresses is depicted in accordance with an advantageous embodiment. Transceiver unit 810 transmits code 808 to transceiver unit 812.

In FIG. 11, an illustration of a portion of a cabin at a fourth point in time for identifying addresses is depicted in accordance with an advantageous embodiment. Transceiver unit 812 transmits code 808 to transceiver unit 816 using link 814. Link 814 is an example implementation of link 602 in FIG. 6. Link 814 allows additional transceiver units to be installed in the physical space used by link 814 without reworking connectors or wiring.

Transceiver unit 816 detects that there are no additional transceiver units within range. Transceiver unit 816 then generates value 1102. Value 1102 is "1" in these examples. Transceiver unit 816 discards code 808 but saves value 1102 as the address of transceiver unit 816. Transceiver unit 816 then transmits value 1102 to transceiver unit 812.

Turning now to FIG. 12, an illustration of a portion of a cabin at a fifth point in time for identifying addresses is depicted in accordance with an advantageous embodiment. Transceiver unit 812 receives value 1102 and increments value 1102 to "2" to form value 1202. Transceiver unit 812 saves value 1202 as the address for transceiver unit 812 and transmits value 1202 to transceiver unit 810.

Next in FIG. 13, an illustration of a portion of a cabin at a sixth point in time for identifying addresses is depicted in accordance with an advantageous embodiment. Transceiver unit 810 receives value 1202 and increments value 1202 to "3" to form value 1302. Transceiver unit 810 saves value 1302 as the address for transceiver unit 812 and transmits value 1302 to computer system 802.

Turning to FIG. 14, an illustration of a portion of a cabin at a seventh point in time for identifying addresses is depicted in accordance with an advantageous embodiment. Computer system 802 receives value 1302 of "3" and sets the size of transmission buffer 804 and receiving buffer 806 to a 3.

Figure 15:
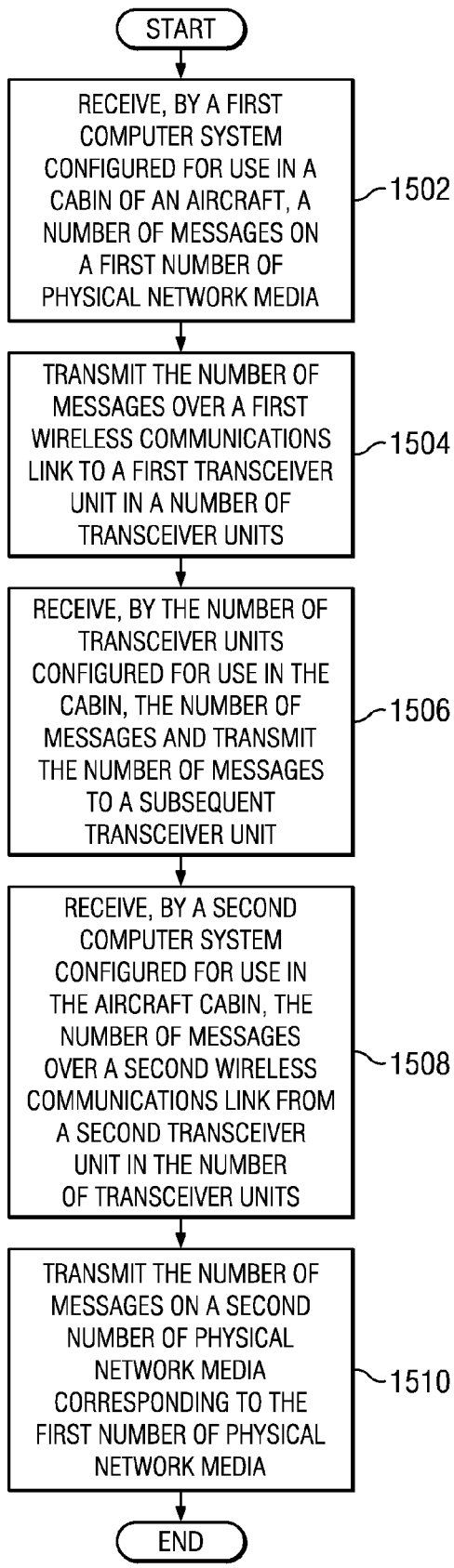
FIG. 15 is a flowchart of a process for transmitting messages in accordance with an advantageous embodiment.

In FIG. 15, an illustration flowchart of a process for transmitting messages is depicted in accordance with an advantageous embodiment. The process may be performed in transmission environment 400 by computer system 802, number of transceiver units 456 and computer system 414 in FIG. 4.

The process begins by receiving, by a first computer system configured for use in a cabin of an aircraft, a number of messages on a first number of physical network media (operation 1502). The computer system may be a data processing system, such as data processing system 300 in FIG. 3. A physical network medium is a physical substance capable of carrying data from one device to another. Examples of physical network media include Ethernet, CAN bus, and discrete signal media.

The process then transmits the number of messages over a first wireless communications link to a first transceiver unit in a number of transceiver units (operation 1504). The wireless communications link may be an infrared link.

The process then receives, by the number of transceiver units configured for use in the cabin, the number of messages and transmits the number of messages to a subsequent transceiver unit (operation 1506). The subsequent transceiver unit is identified based on a physical position of the each of the number of transceiver units to one another.

The process then receives, by a second computer system configured for use in the aircraft cabin, the number of messages over a second wireless communications link from a second transceiver unit in the number of transceiver units (operation 1508).

The process transmits the number of messages on a second number of physical network media corresponding to the first number of physical network media (operation 1510). The second number of physical network media may be of the same types as the first physical network media. The second computer system selects a physical network media from the second number of physical network media that corresponds to the first number of physical network media based on the network on which the message was received by the first computer system. For example, if the message was received at the first computer system on an Ethernet network, the second computer system recreates the data on an Ethernet network in the second number of physical network media. In some advantageous embodiments, an identifier is included in the message that indicates on which network the second computer system is to recreate the message. The process terminates thereafter.

Figure 16:
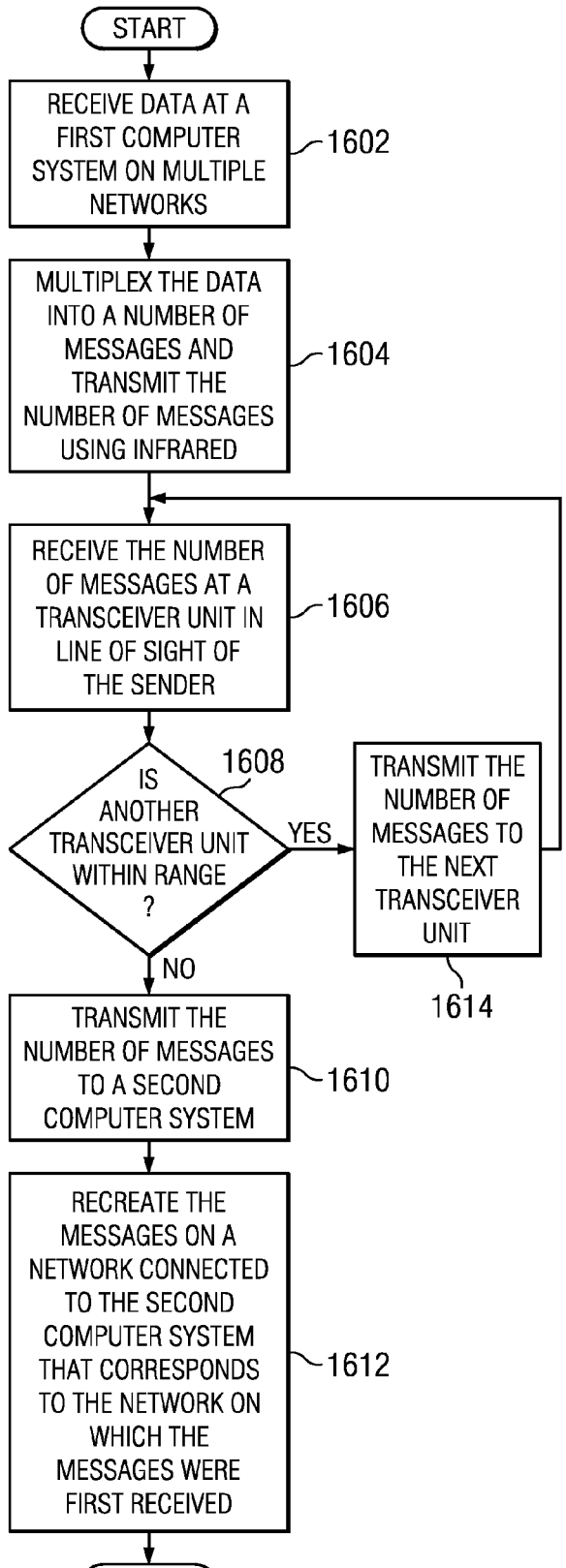
FIG. 16 is a flowchart of an additional process for transmitting messages in accordance with an advantageous embodiment.

Turning now to FIG. 16, a flowchart of an additional process for transmitting messages is depicted in accordance with an advantageous embodiment. The process may be performed in transmission environment 400 by computer system 802, number of transceiver units 456 and computer system 414 in FIG. 4.

The process begins by receiving data at a first computer system on multiple networks (operation 1602). The computer system may be a data processing system, such as data processing system 300 in FIG. 3.

The process then multiplexes the data into a number of messages using infrared (operation 1604). The process then receives the number of messages at a transceiver unit in line of sight of the sender (operation 1606).

The process then determines whether another transceiver unit is within range (operation 1608). If the process determines that another transceiver unit is within range, the process transmits the number of messages to the next transceiver unit (operation 1614) and the process returns to operation 1606. If the process determines that another transceiver is within range at operation 1608, the process transmits the number of messages to a second computer system (operation 1610). The process then recreates the messages on a network connected to the second computer system that corresponds to the network on which the messages were first received (operation 1612). The process terminates thereafter.

Figure 17:
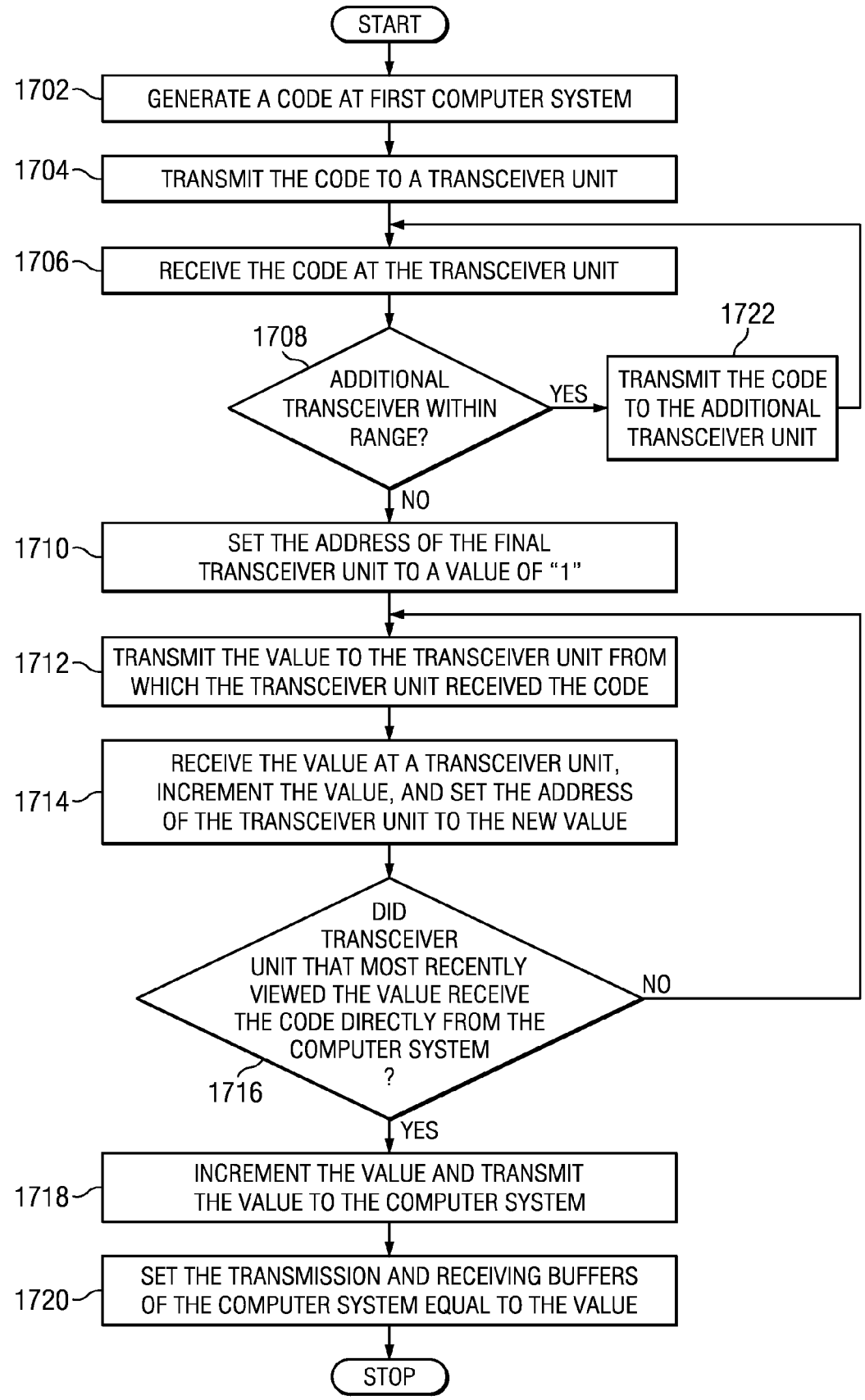
FIG. 17 is a flowchart of a process for identifying an address for each transceiver unit in accordance with an advantageous embodiment.

Turning now to FIG. 17, a flowchart of a process for identifying an address for each transceiver unit is depicted in accordance with an advantageous embodiment. The process may be performed in transmission environment 400 by computer system 802, number of transceiver units 456 and computer system 414 in FIG. 4.

The process begins by generating a code at a first computer system (operation 1702). The computer system may be a data processing system, such as data processing system 300 in FIG. 3. The code may be recognized by the transceiver units as an addressing code.

The process then transmits the code to a transceiver unit (operation 1704). The process may use an infrared link to transmit the code. The process then receives the code at the transceiver unit (operation 1706).

The process then determines if an additional transceiver unit is within range (operation 1708). If the process determines that an additional transceiver is within range, the process transmits the code to the additional transceiver unit (operation 1722). The process then returns to operation 1706. If the process determines that an additional transceiver unit is not within range at operation 1708, the process sets the address of the final transceiver unit to a value of "1" (operation 1710).

The process transmits the value to the transceiver unit from which the transceiver unit received the code (operation 1712). The process then receives the value at a transceiver unit, increments the value, and sets the address of the transceiver unit to the new value (operation 1714).

The process determines if the transceiver unit that most recently received the value received the code directly from the computer system (operation 1716). If the process determines that the transceiver unit that most recently received the value did not receive the code directly from the computer system, the process returns to operation 1712. If the process determines that the transceiver unit that most recently received the value did receive the code directly from the computer system at operation 1716, the process increments the value and transmits the value to the computer system (operation 1718).

The process then sets the transmission and receiving buffers of the computer system equal to the value (operation 1720) and the process terminates thereafter.

The flowchart and block diagrams in the different depicted embodiments illustrate the architecture, functionality, and operation of some possible implementations of systems and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the process may not perform operation 1608 of particular number of transceiver units have been identified. Additionally, the process may negotiate a rate of transfer and/or a security protocol with the next transceiver unit at operation 1610 prior to transmitting the number of messages. Additionally, the process may recreate the number of messages on a particular network at operation 1510, or may recreate the messages on different networks based on a set of policies or rules.

Thus, the different advantageous embodiments allow the passenger service units to be moved to other locations without reworking wiring or connectors and reducing weight and maintenance costs. Units may also be added or removed from the system and the system automatically re-addresses the new and/or remaining units.

Thus, the different advantageous embodiments provide a system and method for transmitting messages. In one advantageous embodiment, a system comprising a number of transceiver units, first computer system, and a second computer system is provided. The number of transceiver units are configured for use in a cabin of an aircraft, each of the number of transceiver units being configured to receive a number of messages and transmit the number of messages to a subsequent transceiver unit, wherein the subsequent transceiver unit is identified based on a physical position of the each of the number of transceiver units to one another. The first computer system is configured for use in the cabin, the first computer system being configured to receive the number of messages on a first number of physical network media and transmit the number of messages over a first wireless communications link to a first transceiver unit in the number of transceiver units. The second computer system is configured for use in the aircraft cabin, the second computer system being configured to receive the number of messages over a second wireless communications link from a second transceiver unit in the number of transceiver units, the second computer system being further configured to transmit the number of messages received over the second wireless communications link on a second number of physical network media corresponding to the first number of physical network media.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
  a number of transceiver units configured for a cabin of a vehicle, each of the number of transceiver units being configured to receive a number of messages and transmit the number of messages to a subsequent transceiver unit, wherein the subsequent transceiver unit is identified based on a physical position of each of the number of transceiver units;
  a first computer system configured for the cabin, the first computer system being configured to receive the number of messages on a first number of physical network media and transmit the number of messages over a first wireless communications link to a first transceiver unit in the number of transceiver units; and
  a second computer system configured for the cabin, the second computer system being configured to receive the number of messages over a second wireless communications link from a second transceiver unit in the number of transceiver units, the second computer system being further configured to transmit the number of messages received over the second wireless communications link on a second number of physical network media corresponding to the first number of physical network media.

2. The system of claim 1, wherein the vehicle is an aircraft and further comprising:

the aircraft, wherein the cabin is located inside of the aircraft and the number of transceiver units are located above a column of seats onboard the aircraft.

3. The system of claim 2, wherein each of the number of transceiver units are associated with a passenger service unit.

4. The system of claim 1 further comprising:
the first computer system, via a first protocol, identifying an address for each of the transceiver units.

5. The system of claim 4, wherein the number of transceiver units are located substantially in a row and the first protocol further comprises:
a second protocol comprising:
transmitting a code from the first computer system to each of the number of transceiver units in an order;
receiving the code at a final transceiver unit in the number of transceiver units in the row, transmitting a value from the final transceiver unit to each of the number of transceiver units in a reverse of the order; and
receiving the value at the first computer system.

6. The system of claim 5, wherein the vehicle is an aircraft and the first wireless communications link is an infrared link.

7. The system of claim 6, wherein the first number of physical network media and the second number of physical network media are selected from an Ethernet medium, a controller area network (CAN) bus medium, and a discrete signal medium.

8. The system of claim 1, wherein the subsequent transceiver unit being determined based on the physical position of each of the number of transceiver units to the one another further comprises the subsequent transceiver unit being located within a line of sight of a transceiver unit in each of the number of transceiver units that most recently received the number of messages.

9. A method of transmitting messages, the method comprising:
receiving, by a first computer system configured for a cabin of a vehicle, a number of messages on a first number of physical network media and transmitting the number of messages over a first wireless communications link to a first transceiver unit in a number of transceiver units;
receiving, by the number of transceiver units configured for the cabin, the number of messages and transmitting the number of messages to a subsequent transceiver unit, wherein the subsequent transceiver unit is identified based on a physical position of each of the number of transceiver units; and
receiving, by a second computer system configured for the cabin, the number of messages over a second wireless communications link from a second transceiver unit in the number of transceiver units, wherein the second computer system transmits the number of messages received over the second wireless communications link on a second number of physical network media corresponding to the first number of physical network media.

10. The method of claim 9 further comprising:
identifying an address for each transceiver unit on the first wireless communications link.

11. The method of claim 10, wherein the first computer system is a source computer system, and wherein the step of identifying the address for each transceiver unit on the first wireless communications link further comprises:

transmitting a code from the source computer system to a last transceiver unit on the first wireless communications link, wherein each transceiver unit receives the code and repeats the code to another transceiver unit on the first wireless communications link;
responsive to receiving the code at a last transceiver unit on the first wireless communications link, transmitting a value to the source computer system, wherein each transceiver unit receives the value and increments the value prior to repeating the value to the another transceiver unit; and
receiving the value at the source computer system.

12. The method of claim 11 further comprising:
setting a size of a number of buffers at the source computer system to the value.

13. The method of claim 9 further comprising:
receiving the number of messages from the first computer system at the second transceiver unit; and
transmitting the number of messages from the second transceiver unit to the second computer system.

14. The method of claim 13 further comprising:
responsive to receiving the number of messages from the first computer system at the transceiver unit, determining whether a message in the number of messages is addressed to the second transceiver unit; and
responsive to a determination that the number of messages are addressed to the second transceiver unit, processing the number of messages by the second transceiver unit.

15. The method of claim 13, wherein the first computer system, the second computer system, and the transceiver unit are located in the cabin and the vehicle is an aircraft.

16. The method of claim 15, wherein the transceiver unit is located above a column of seats onboard the aircraft and associated with a number of panels.

17. The method of claim 9, wherein the first wireless communications link is an infrared link.

18. The method of claim 9, wherein the first wireless communications link is a different medium than each of the first number of physical network media and each of the second number of physical network media.

19. The method of claim 9, wherein the step of transmitting the number of messages from the first number of physical network media over the first wireless communications link further comprises:
multiplexing the number of messages onto the first wireless communications link.

20. An apparatus comprising:
a first computer system configured to receive a number of messages on a first number of physical network media and transmit the number of messages on a communications link that is different from the first number of physical network media; and
a second computer system, configured to transmit the number of messages on a second number of physical network media in response to receiving the number of messages on the communications link, wherein each of the number of messages is transmitted on a second physical network medium comprised by the second number of physical network media corresponding to a first physical network medium comprised by the first number of physical network media on which each of the number of messages was received at the first computer system.

* * * * *